United States Patent [19]

Nerhus et al.

[11] Patent Number: 4,959,888

[45] Date of Patent: Oct. 2, 1990

[54] SAUSAGE TWISTING APPARATUS AND METHOD

[75] Inventors: Arne Nerhus, Ølve; Johan Nerhus, Klofterhagen 78, N-1067 Oslo 10, both of Norway

[73] Assignees: Ølve Industrier A/S, Ølve; Johan Nerhus, Oslo, both of Norway

[21] Appl. No.: 418,636

[22] Filed: Oct. 10, 1989

[51] Int. Cl.$^5$ .............................................. A22C 11/10
[52] U.S. Cl. ........................................ 17/34; 17/1 F; 17/49
[58] Field of Search ............... 17/1 F, 34, 33, 49; 138/118.1

[56] References Cited

U.S. PATENT DOCUMENTS

| 3,115,668 | 12/1963 | Townsend | 138/118.1 |
| 3,620,431 | 11/1971 | Wallace | 17/1 F |
| 3,694,853 | 10/1972 | Greider | 17/33 |
| 4,494,276 | 1/1985 | Trottman | 17/1 F |
| 4,547,931 | 10/1985 | Staudenrausch et al. | 17/1 F |
| 4,583,264 | 4/1986 | Nausedas | 17/1 F |
| 4,880,105 | 11/1989 | Kasai et al. | 17/1 F |

*Primary Examiner*—Willis Little
*Attorney, Agent, or Firm*—Wenderoth, Lind & Ponack

[57] ABSTRACT

An apparatus for twisting a continuous, filled tube of membranous tissue into a string of sausages, includes a pair of parallelly opposed, spaced belt conveyors for pulling in a length of the continuous tube longitudinally therebetween, a constrictor for constricting and pinching such length of tube at an end thereof, structure for relative lateral displacement of the belt conveyors to roll the length of tube therebetween about its longitudinal axis, thereby twisting the tube length end adjacent the constrictor, and device for driving the belt conveyors.

8 Claims, 1 Drawing Sheet

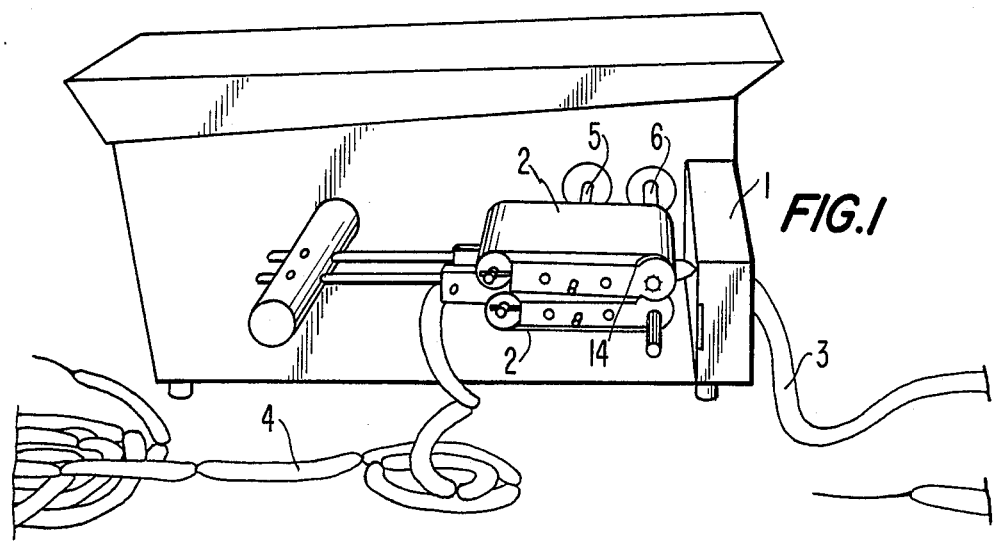
FIG. 1
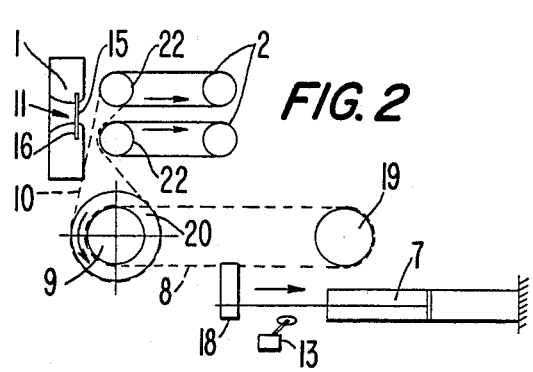
FIG. 2
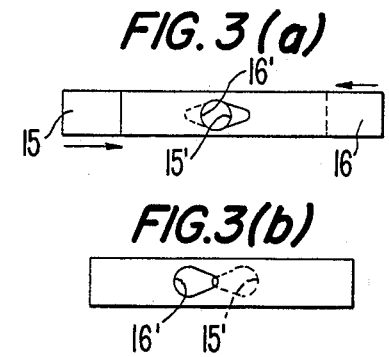
FIG. 3(a)
FIG. 3(b)
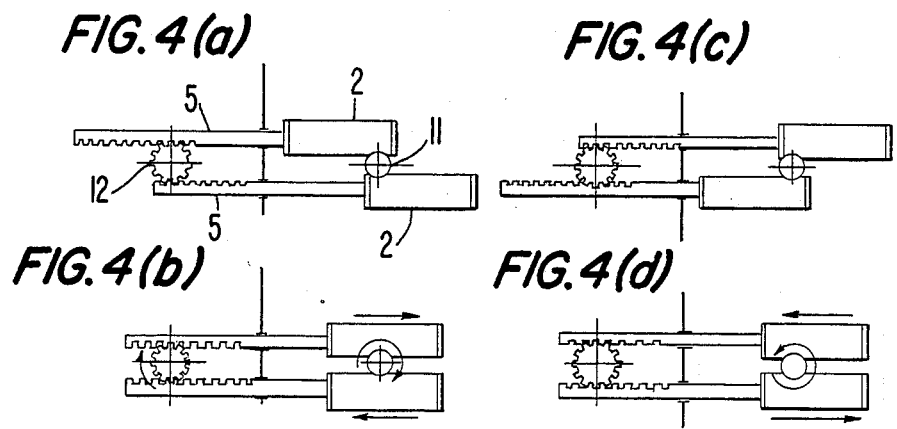
FIG. 4(a)
FIG. 4(b)
FIG. 4(c)
FIG. 4(d)

SAUSAGE TWISTING APPARATUS AND METHOD

BACKGROUND OF THE INVENTION

The invention relates to an apparatus and method for twisting a continuous tube of membranous, e.g. intestine tissue, filled with forcemeat into a string of sausages.

A problem encountered by a sausage maker is to find a satisfactory way of mechanically twisting the continuous tube of filled intestine into individual sausages of a uniform predetermined length. There are machines on the market for this purpose, but they are cumbersome in use with respect to adjusting the length of the sausages, maintenance and cleanliness.

SUMMARY OF THE INVENTION

The present invention provides an apparatus or machine in which the length adjustment of each sausage can be carried out in an infinitely varied manner, irrespective of whether the machine is working or at rest. A simple and practical construction allows for easy maintenance of the machine. The work necessary for cleaning the machine is reduced to a minimum thanks to the invention. The machine can be placed directly onto a working table of the sausage maker, connected to compressed air mains, and is then ready for use.

According to the invention the filled continuous sausage tube is fed into an inlet opening of a constrictor and in between two spaced, parallelly opposed belt conveyors advancing the tube a predetermined distance. The constrictor closes to form interstices between sausages of a predetermined length. Then the conveyors are caused to perform a lateral movement relative to each other thereby rolling the sausage between them about its longitudinal axis. resulting in a twisting of the sausage tube at the constriction point. The constrictor then opens and the next predetermined length of sausage tube is pulled in between the conveyors, the constrictor closes and the conveyors again perform a relative lateral displacement, rolling and twisting this next sausage about its longitudinal axis in a direction opposite of the preceding one.

BRIEF DESCRIPTION OF THE DRAWINGS

An embodiment of the apparatus according to the invention will now be described in detail with reference to the accompanying schematic drawings, in which:

FIG. 1 is a perspective view of the apparatus in use,

FIG. 2 is a diagrammatic side view of the apparatus illustrating a feed function thereof, FIGS. 3(a) and 3(b) are diagrammatic end views illustrating the constricting function of the apparatus, and FIGS. 4(i a)–4(d) are diagrammatic end views of the conveyors illustrating successive steps of a twisting function.

DETAILED DESCRIPTION OF THE INVENTION

The apparatus according to the invention essentially consists of a sausage tube constrictor generally denoted by reference numeral 1 having an inlet opening 11; a pair of opposed, parallelly extending, spaced belt conveyors 2, means 7, 8, 9, 10 for controlled driving of the pair of belt conveyors 2, and means 5, 12 for relative, lateral displacement of the conveyors 2.

The constrictor 1 comprises a pair of opposed plates 15, 16 each having an oblong aperture 15', 16' tapering in opposite directions. The plates are relatively laterally slidable in opposite directions between an offset position in which their apertures 15', 16' form a substantially circular tube inlet opening of maximum area therethrough as shown in FIG. 3(a) and an aligned position in which their apertures form a tube constriction of minimum area as shown in FIG. 3(b).

The means for driving the conveyors 2 include a power cylinder 7, preferably a pneumatic cylinder, the piston rod of which through an intermediary member 18 is connected to an endless chain 8 running between two sprockets 9, 19 one, 9, of which is intermittently connected to a further sprocket 20 via a one way clutch (not shown) which is engaged during the inward stroke of the cylinder 7 piston rod and disengaged during the outward stroke thereof. The sprocket 20 carries a second endless chain 10 operatively connected to a sprocket 22 of each of the conveyors 2 as shown in FIG. 2 to move the latter synchronously via splined drive shafts 6 and correspondingly internally splined drive rolls 14 with the facing belt parts of the conveyors moving in the same direction as indicated with arrows in FIG. 2.

Each conveyor 2 has a rack 5 secured to a side thereof and extending perpendicularly thereto in the same direction as appearing from FIGS. 4(a)–4(d). A pinion 12 meshing with the two racks 5 at diametrically opposite positions and driven by a suitable means such as a torque cylinder (not shown) provides for relative lateral displacement of the two conveyors 2 in opposite directions, sliding on the splined drive shafts 6.

The apparatus according to the invention operates as follows.

Starting with the piston rod of the power cylinder 7 in an extended end position the continuous tube 3 filled with forcemeat and closed at each end thereof is inserted through the inlet opening 11 of the constrictor 1, the slide plates 15. 16 of the latter being in their extended positions as shown in FIG. 3(a) where their apertures 15', 16' form a maximum through-opening, and in between the spaced, facing belts of the pair of conveyors 2. The power cylinder 7 is then caused to contract, moving its piston rod to the right as seen in FIG. 2, to urge the lower part of the chain 8 in the same direction via intermediary member 18, thereby rotating the sprocket 9 and consequently, via the engaged one way clutch, the sprocket 20 in an counter-clockwise direction as indicated in FIG. 2. Such movement of the sprocket 20 causes the chain 10 to drive the pair of conveyors 2 as explained above, pulling sausage tube 3 along between them. At a preselected position of its inward stroke the piston rod of the cylinder 7 activates an end switch 13 which causes the cylinder 7 to reverse the direction of movement of its piston rod and thus of the chain 8 and sprocket 9. Sprocket 20, however, owing to the one way clutch as mentioned above being disengaged, is not moving during this outward stroke of the piston rod and therefore the pair of conveyors 2 is inactive during the expanding mode of the cylinder 7.

In addition to reversing the direction of the cylinder 7 piston rod the end switch 13 also activates means (not shown) contracting the two slide plates 15, 16 relative to one another to constrict and pinch the continuous sausage tube 3 in the reduced opening now formed by the apertures 15', 16'. Then the pinion 12 is rotated in a clockwise direction as indicated in FIG. 4(b), causing a relative lateral displacement of the two conveyors 2 in opposite, reversed directions until they reach the relative positions shown in FIG. 4(c), opposite of those shown in FIG. 4(a). Such relative displacement of the two conveyors 2 subjects the length of sausage tube 3 that was pulled in between the conveyors 2 during the expanding mode of the cylinder 7 to a rolling movement about its longitudinal axis resulting in a thorough twisting of the end of that tube length pinched in the constrictor 1 to form a completed individual sausage.

By now the piston rod of the cylinder 7 has returned to its extended start position in which the end switch 13 (or some other end switch) is again activated to reverse the direction of movement of the piston rod and open the constrictor 1 to allow the pair of conveyors 2 now driven by the cylinder 7 via the engaged one way clutch to pull in a further length of sausage tube 3 while the preceding first sausage emerges from the conveyor pair. End switch 13 is again activated to stop and reverse the piston rod inward stroke and close constrictor 1. Pinion 12 is again caused to rotate, but now in a counter-clockwise direction as indicated in FIG. 4(d) to move the conveyors 2 relative to one another in reversed directions to roll and twist the length of sausage tube 3 between them in a direction opposite to the preceding direction until they reassume their initial positions shown in FIG. 4(a). Then the above described cycle of the apparatus repeats itself to produce a continuous string of individual sausages 4 as shown in FIG. 1 interconnected by oppositely twisted intervals.

The length of each individual sausage thus produced is determined by the position of the end switch 13 controlling the stroke of the piston rod of the power cylinder 7. Thus such sausage length can be varied during standstill as well as during operation of the apparatus, simply by changing the position of the end switch 13 along the axis of the conveyor drive cylinder 7.

We claim:

1. An apparatus for twisting a continuous, filled tube of membranous tissue into a string of sausages, said apparatus comprising:
    a pair of parallelly opposed, spaced belt conveyors for pulling in a length of the continuous tube longitudinally therebetween,
    means for constricting and pinching the length of tube at an end thereof,
    means for relative lateral displacement of said belt conveyors to roll the length of tube therebetween about its longitudinal axis, thereby twisting the tube length end adjacent said constrictor, and
    means for driving said belt conveyors.

2. An apparatus according to claim 1, wherein said means for driving said belt conveyors comprises a power cylinder.

3. An apparatus according to claim 2, wherein said power cylinder is a pneumatic cylinder.

4. An apparatus according to claim 2, wherein said power cylinder is operatively connected to said belt conveyors through a one way clutch engaged during the tube pulling step of said conveyors and disengaged during the relative lateral displacement thereof.

5. An apparatus according to claim 1, wherein said means for relative lateral displacement of said conveyors is a rack and pinion arrangement interconnecting said pair of conveyors.

6. An apparatus according to claim 1, comprising splined drive shafts cooperating with internally splined drive rolls of said conveyors to drive the latter and permit lateral displacement thereof along said splined drive shafts.

7. An apparatus according to claim 1, comprising an end switch activated by said belt conveyor driving means, permitting variation of the length of each individual sausage by varying the position of said end switch relative to said driving means.

8. A method for twisting a continuous, filled tube of membranous tissue filled with forcemeat into a string of individual sausages, said method comprising the steps of:
    pulling a length of said continuous tube in between two parallelly opposed, spaced belt conveyors,
    constricting and pinching the pulled in tube length at an end thereof,
    relatively displacing said conveyors laterally in opposite directions to cause a rolling movement of said length of tube about its longitudinal axis, thereby twisting the tube at the point of constriction thereof,
    releasing said tube from the pinching thereof,
    pulling in a further length of tube between said conveyors,
    constricting and pinching an end of said further length of tube at its point of constriction, and
    displacing said conveyors laterally in opposite, reversed directions.

* * * * *